United States Patent [19]
Goedecke

[11] Patent Number: 6,108,921
[45] Date of Patent: Aug. 29, 2000

[54] SCRAPER FOR DETERMINING THE POSITION OF PIPELINES

[75] Inventor: Hartmut Goedecke, Weilburg, Germany

[73] Assignee: Pipetronix GmbH, Stutensee, Germany

[21] Appl. No.: 09/095,021

[22] Filed: Jun. 9, 1998

[30] Foreign Application Priority Data

Jun. 12, 1997 [DE] Germany .......................... 197 24 838

[51] Int. Cl.$^7$ .............................................. E21B 47/022
[52] U.S. Cl. ................................................ 33/304; 33/313
[58] Field of Search ............................ 33/304, 302, 305, 33/306, 307, 313, 542, 544, 544.1, 544.2, 544.3, 544.4, 544.5, 544.6, 542.1

[56] References Cited

U.S. PATENT DOCUMENTS

| | | | |
|---|---|---|---|
| 3,060,588 | 10/1962 | Lanmon, II et al. | 33/544.3 |
| 3,942,560 | 3/1976 | Deaver | 138/89 |
| 3,964,171 | 6/1976 | Gambini et al. | 33/544.2 |
| 4,458,601 | 7/1984 | Braithwaite et al. | 104/138.2 |
| 4,747,317 | 5/1988 | Lara | 73/865.8 |
| 5,392,527 | 2/1995 | Ziskovsky et al. | 33/542 |

FOREIGN PATENT DOCUMENTS

| | | | |
|---|---|---|---|
| 1288290 | 2/1987 | U.S.S.R. | 33/304 |

*Primary Examiner*—Andrew H. Hirshfeld
*Assistant Examiner*—Richard A Smith
*Attorney, Agent, or Firm*—Antonelli, Terry, Stout & Kraus, LLP

[57] ABSTRACT

Scraper for determining the position of pipelines with at least one scraper body and on the outer circumference of the latter are provided support elements for guiding in the pipeline, the scraper body containing a gyroscopic platform, as well as supply and processing means for measured results, characterized in that the scraper body is guidable by a combination of support elements under a defined, constant angle with respect to the pipe guidance axis, whereof a first part is radially rigid and a second part is radially resilient.

18 Claims, 4 Drawing Sheets

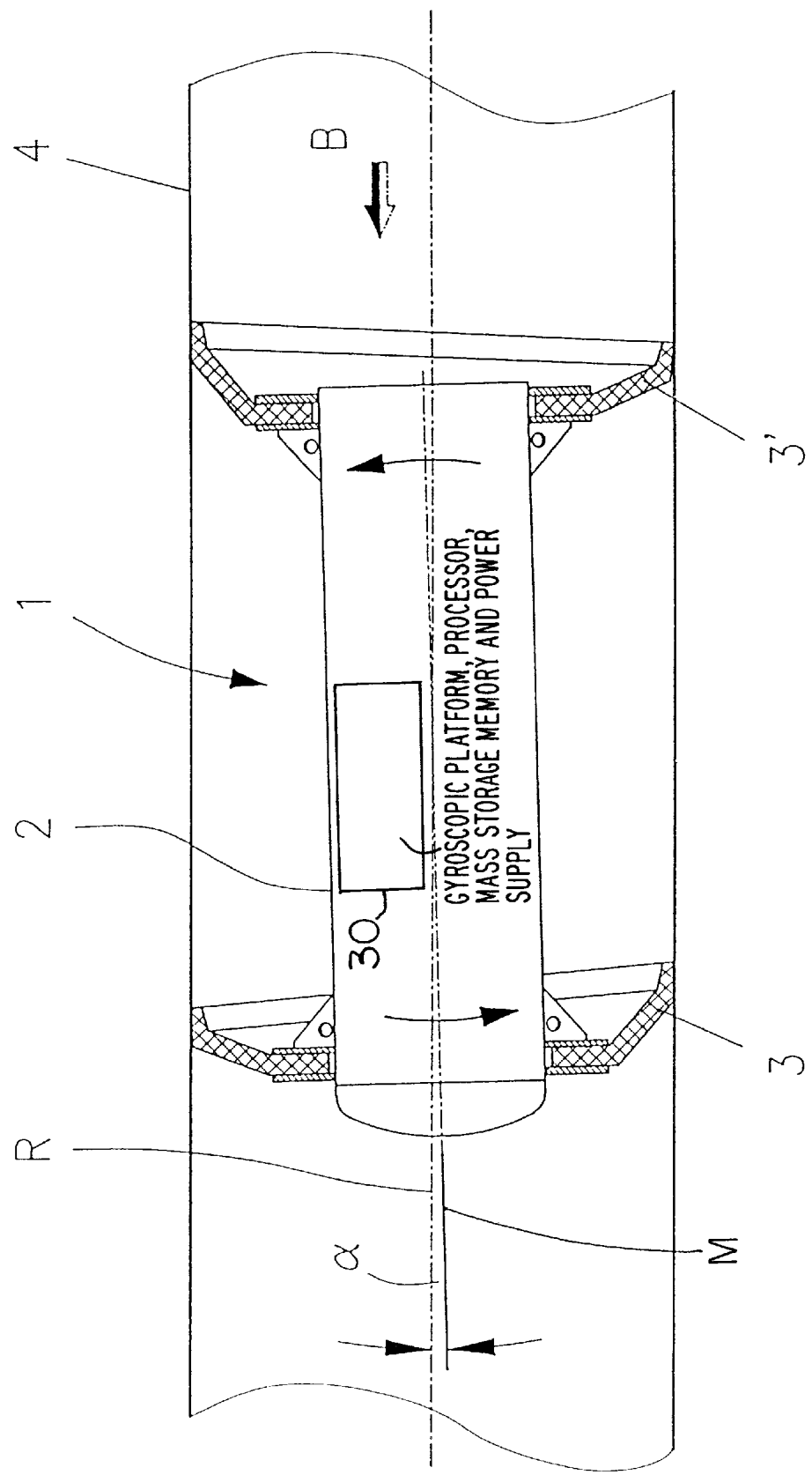

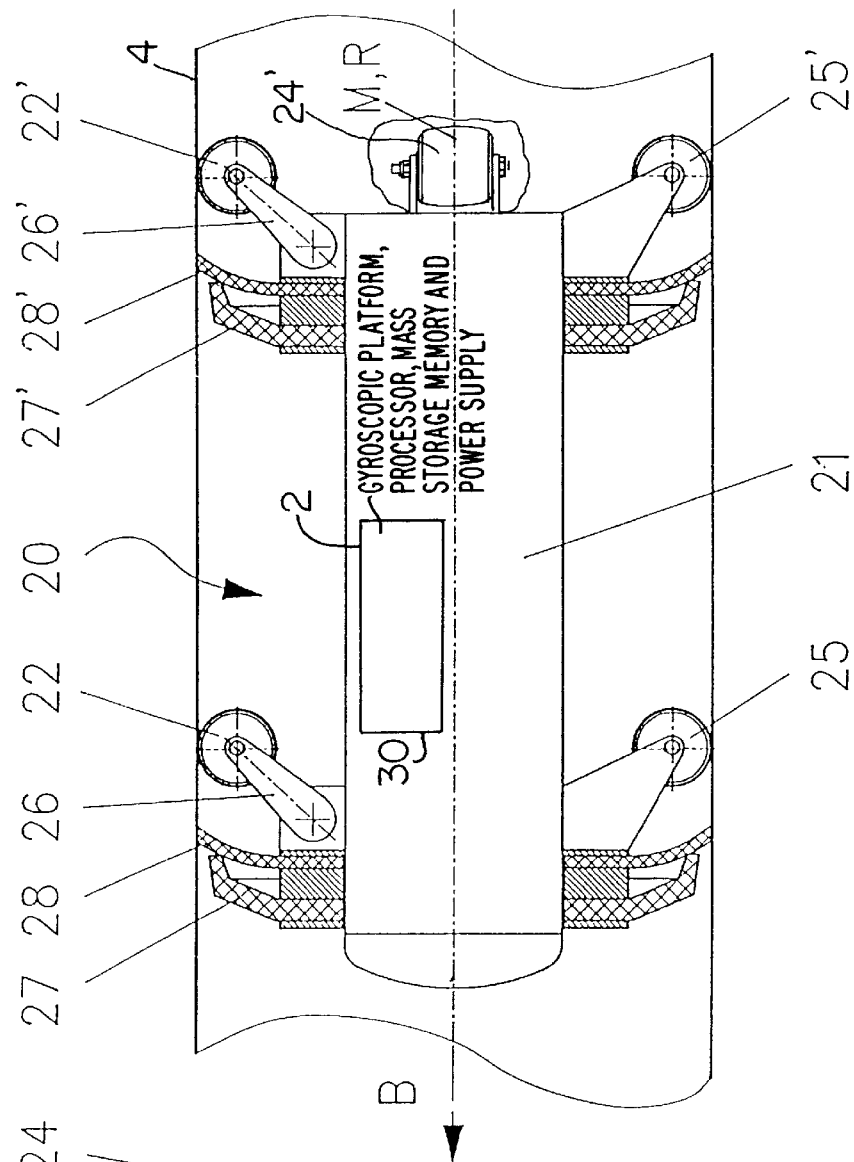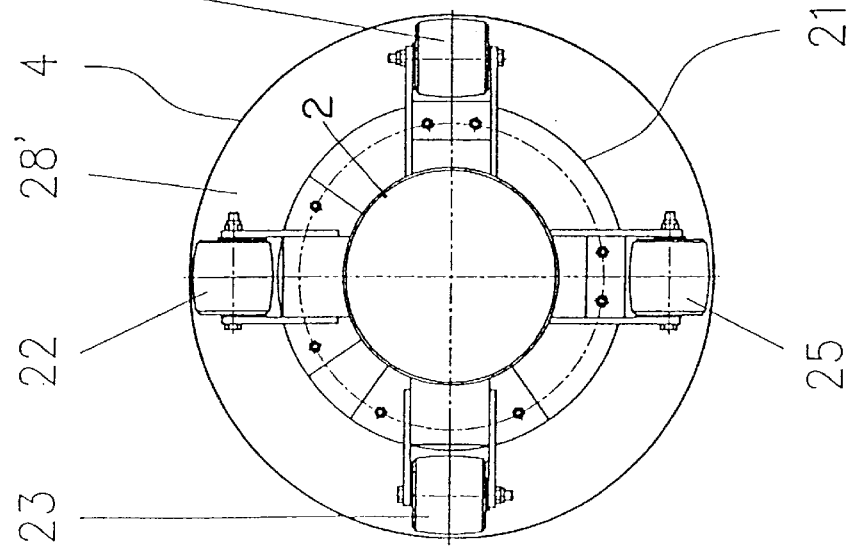

SCRAPER FOR DETERMINING THE POSITION OF PIPELINES

BACKGROUND OF THE INVENTION

1. Field of the Invention

The invention relates to a scraper for determining the position of pipelines and having at least one scraper body and support elements located on its outer circumference for guidance in the pipeline, the scraper body containing a gyroscopic platform, as well as supply and a processor for the measured results.

2. Description of the Prior Art

Such surveying scrapers known as gyroscopic scrapers are e.g. used for surveying the route of old, existing pipelines, where the precise path thereof in the countryside is unknown. The data collected by the scraper are transformed on evaluation into a known coordinate system, so that the precise space coordinates are known for every point along the pipeline route. If desired, this information can be used in an accurate map for the plotting of the route. In addition, such scrapers are used for discovering faults in pipelines and then additionally cooperate with so-called intelligent scrapers. For discovering faults use is made of the data supplied by the measurements of the gyroscopic scraper, in order e.g. in a so-called GPS system, to rapidly and easily locate the correct fault along the pipeline route.

Another field of use is the determination of local position changes, because e.g. in areas with unstable terrain, such as e.g. abrupt slopes, pit subsidence areas, areas with drifting sand or permafrost soil, the pipeline position can change as a result of earth movements, so that serious stresses occur in the pipe, which in an extreme case can lead to folding or even fracture of the pipe. When surveying such pipelines at regular intervals with a gyroscopic scraper, these position changes can be roughly determined, in order to calculate the stresses which have built up in the pipeline. On reaching specific stress levels, countermeasures can be initiated, before more serious damage occurs.

In order to be able to carry out such surveys, the scraper has a pressure-resistant body for receiving the electronics and measuring equipment, as well as support elements for guiding on the inner wall of the pipeline to be surveyed. In addition, a gyroscopic platform is installed in the pressure-resistant body, together with the data processing electronics and the mass memory. For path measurement purposes, such a scraper has several odometer systems and by means of a marker system fixed points are set along the pipeline. After passing through the pipeline, the data are then taken from the scraper and evaluated with special software programs. In order that the data provide valid information, the gyroscopic platform must be guided in a uniform position parallel to the pipe axis or wall. In practice it means that the precise position of the scraper body axis relative to the pipe axis must be known. The measured results are falsified if this position is changed. Normally the scraper bodies are guided in the pipeline by means of collars or rollers as support elements. As the pipe diameter is not always constant, the support and guidance elements must be sufficiently flexible for them to be able to compensate diameter changes. In the case of collars this is brought about by the rubber-like flexibility of the material, whereas in the case of a roller guide, the rollers are suspended on spring-loaded, bend-in arms. As a result of the propelling force acting from the rear when the scraper travels through the pipeline, the scraper has a dynamic buckling tendency, so that the angle between the scraper axis and the pipe axis does not remain constant during travel or running. If the support elements are scraper collars or sleeves, it is also possible for there to be a change in the position of the scraper body relative to the pipe axis due to wear to such collars or sleeves.

Therefore a scraper has already been proposed, in which there is an additional arrangement of ultrasonic sensors in annular manner both at the front and rear of the scraper body, so as to constantly measure the distance from the pipe wall. When evaluating the data, the distance information is utilized in order to establish the position of the scraper body or its axis relative to the pipe axis and perform corresponding corrections. As a result of this additional technical expenditure, the manufacture of the scraper is made much more expensive and the necessary correction during evaluation also increases time expenditure and therefore costs.

The problem solved by the invention is to provide a scraper of the aforementioned type which, in the case of a simpler and cheaper manufacture, provides precise information on the position of the scraper body axis relative to the pipe axis.

The embodiment of the prior art scraper 1 shown in FIG. 1 has a scraper body 2 with a pressure-resistant casing. The casing of the scraper body 2 is surrounded by a conical, flexible material sleeve 3, 3' at the front and rear, axial end of the scraper body. By means of the sleeves 3, 3' serving as support and guidance elements, the scraper 1 is guided through a pipeline 4. The free ends of the sleeves 3, 3' engage on the pipe inner wall. As can be gathered from FIG. 1, as a result of the propelling force acting from the rear and which is indicated by the arrow B, the scraper 1 has a dynamic buckling tendency, so that the angle α between the scraper axis M and the pipe axis R no longer remains constant.

As within the scraper body 2 are installed and fitted a gyroscopic platform, together with data processing electronics, a mass storage memory and a power supply 30. The dynamic buckling of the scraper 1 results in the gyroscopic platform no longer having the necessary uniform position parallel to the pipe axis or wall, so that the data obtained no longer provide valid information.

SUMMARY OF THE INVENTION

According to the invention, the problem of the prior art is solved by a scraper of the aforementioned type, in that the scraper body is guidable by a combination of support elements under a defined, constant angle relative to the pipeline axis, whereof a first part is rigid in the radial direction and a second part is resilient in the radial direction. Thus, according to the invention, there is no correction of the specific position of the scraper body in the pipeline by complicated measuring systems and instead there is a restriction of the freedom of movement of the scraper body in the radial direction within the pipeline. There is no longer any change in the position of the scraper body axis relative to the pipe axis.

Preferably the first part is formed by two rigid travel or sliding elements in the radial direction, which are positioned displaced by 90° on the outer circumference of the scraper body and with respect to which the second part formed by resilient travel or sliding elements as support and guidance elements positioned in the radial direction is positioned in a diametrically facing manner. The first part reduces the freedom of movement and the second part can simply and reliably compensate diameter changes due to the not always constant pipe diameter.

To ensure that the scraper body can always be guided with the same angle relative to the pipe axis and preferably with its axis parallel to the pipe axis through the pipeline, the travel or sliding elements are positioned on the front and rear ends of the scraper body in the axial direction. The orientation of the scraper body now always precisely represents the direction of the pipeline and no longer has its own dynamic life, as is the case with the scraper bodies known from the prior art.

According to a preferred embodiment, the rigid travel or sliding elements are constructed as sliding blocks and a suitable plastics material can be used for their manufacture. In order to reduce or avoid any possible wear when using sliding blocks, so that precision is maintained even when long distances have to be covered, it is alternatively provided that the rigid travel or sliding elements in the radial direction are formed by rollers mounted in fixed manner on the scraper body.

The flexible or radially resilient travel or sliding elements are preferably constituted by sleeve segments of rubber-like material, such as polyurethane. According to another preferred development, they can be elastically mounted rollers, which are preferably suspended on spring-loaded, bend-in arms.

As the pipe wall of the pipelines to be surveyed is interrupted, e.g. in the area of T-pieces, when using rollers or sliding blocks as support elements, they can be introduced into the depression, so that it is not possible to exclude damage to the rollers or sliding blocks serving as support and guidance elements. To prevent this, according to a further development, upstream of the support elements in the scraper body travel direction are provided disks or conically constructed sleeves, whose cylindrical envelope surface has a smaller external diameter than the internal diameter of the pipeline. Thus, during normal travel or running of the scraper, the emergency support elements are not in contact with the pipe wall and consequently do not serve as scraper guidance elements, merely occurring in the area of depressions, etc. as a protection for the rollers or sliding blocks.

In order to ensure the advance of the scraper in the pipeline, according to a further development, flexibility constructed sealing sleeves, which are preferably constructed as sealing disks, are provided following the emergency support elements in the scraper body travel direction. These sealing disks are so sealed in the pipeline, that the necessary travel differential pressure can be built up. As a result of their flexible construction, they do not fulfil a function as a support element for scraper guidance, so that as a result the interaction between the rigid and flexible or resilient travel or sliding elements is not disturbed.

Thus, a scraper for determining the position of pipelines is provided, by means of which it is possible to reliably carry out route surveys, as well as the determination of local position variations of pipelines. It is possible to suspend on the scraper according to the invention, e.g. a so-called measurement spinning unit of a bulge scraper, so as not only to measure the pipe path or local changes thereto, but also to detect bulges or noncircularities on pipelines.

BRIEF DESCRIPTION OF THE DRAWINGS

Further advantages and features of the invention can be gathered from the claims and following description of embodiments, with reference to the attached drawing, wherein show:

FIG. 1 A longitudinal section through a prior art scraper body surrounded by conical, elastic material sleeves.

FIGS. 3A, 3B, and 3C A second embodiment of a scraper according to the invention in longitudinal and transverse section respectively.

DETAILED DESCRIPTION OF THE DRAWINGS

FIGS. 2A and 2B and 3A and 3B show scrapers 10, 20 constructed according to the invention. These scrapers 10, 20 once again have a scraper body 11, 21 with a pressure-resistant casing. In the pressure-resistant body are once again installed the gyroscopic platform, together with the data processing electronics, mass storage memory and power supply 30. The scrapers 10, 20 also have one path measuring odometer systems (not illustrated). There is also a marker system for setting fixed points along the pipeline 4 (and which is also not shown).

Figure 2B:
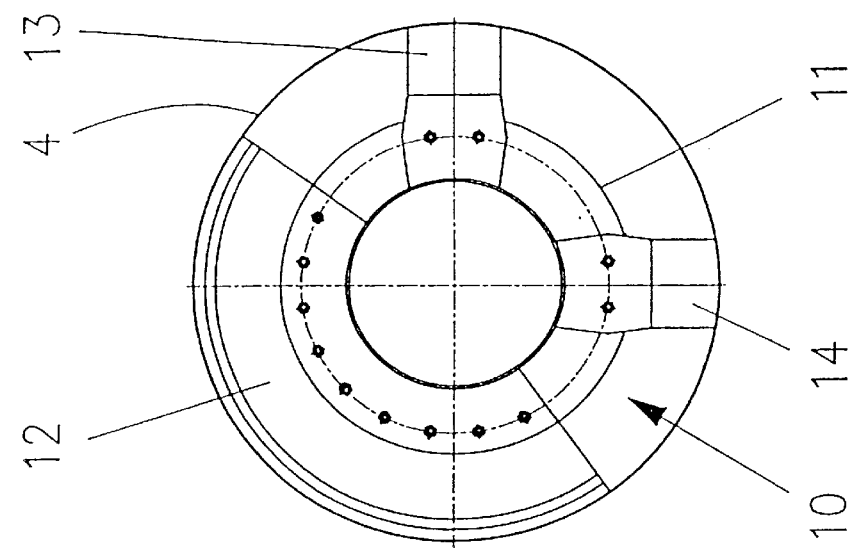
FIGS. 2A, 2B, and 2C A first embodiment of a scraper according to the invention in longitudinal and transverse section respectively.
Figure 2A:
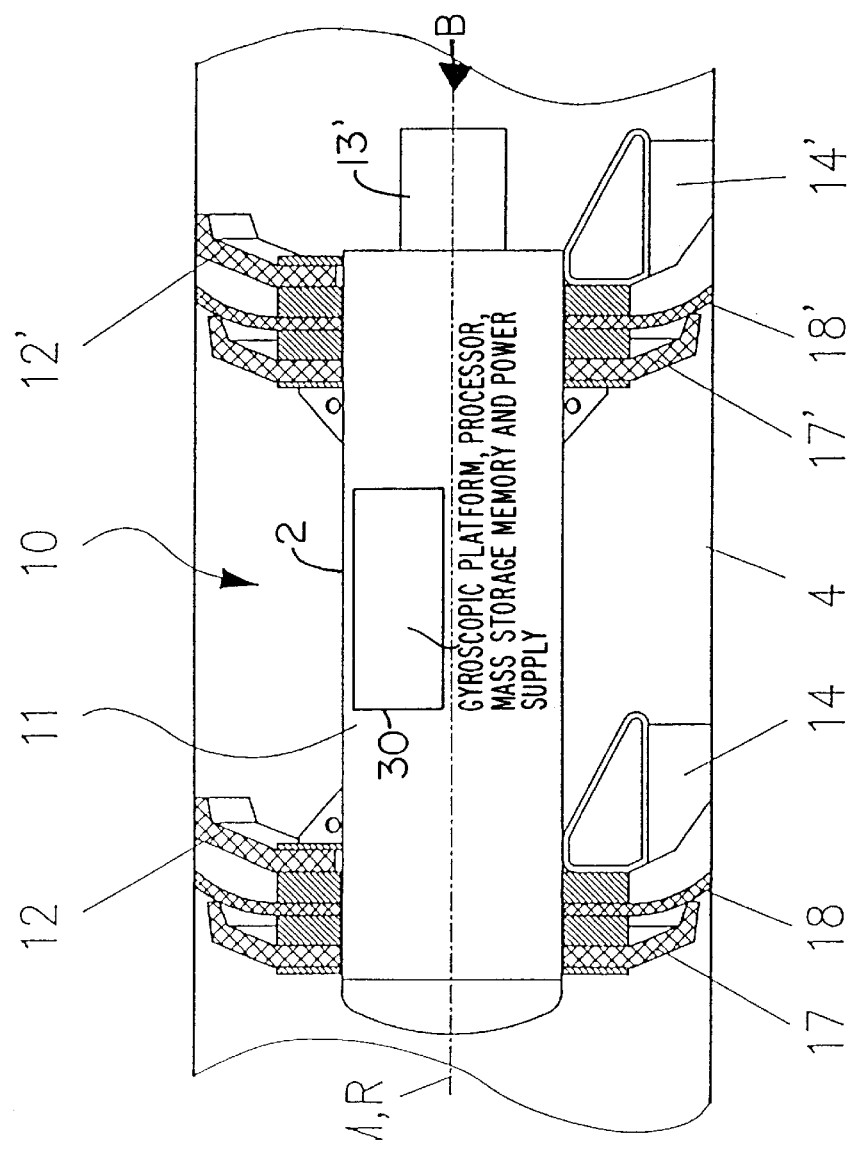
Figure 2C:
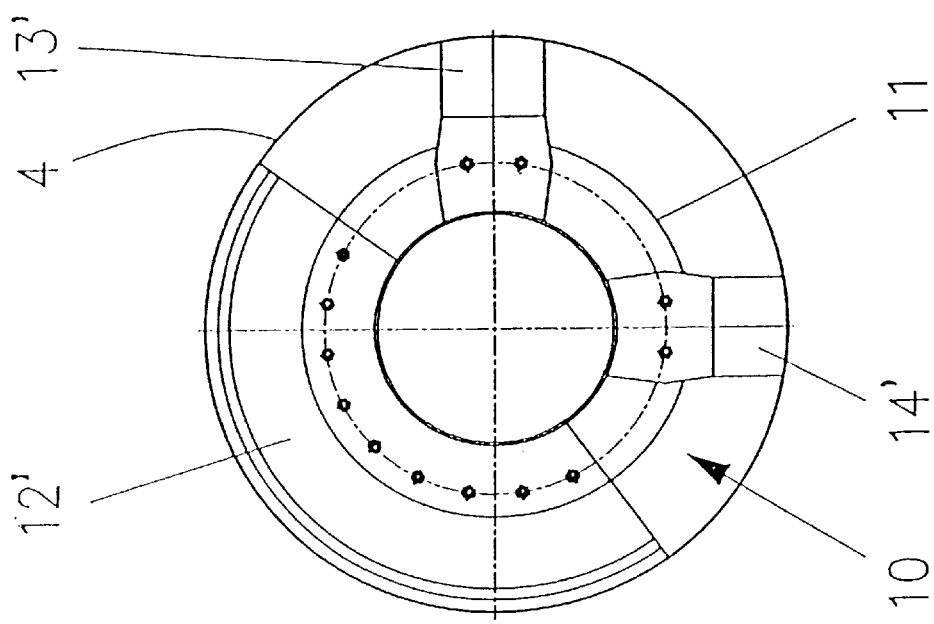

In the embodiment shown in FIGS. 2A, 2B and 2C, on the outer circumference of the scraper 10 and namely on its front and rear, axial ends are provided a rubber-like material, e.g. polyurethane, sleeve segment 12, 12' extending circumferentially over a partial area of the scraper body 11 and serving as flexible, radially elastic sliding elements. On the other circumferential half of the scraper body 11 are provided two sliding blocks 13, 14 at the front 13; and 14' at the rear, which are fixed at 90° from one another on the outside of the scraper body as a radially rigid sliding element. The sliding blocks 13, 14 and 13', 14', made from a plastics or similar material are, as can be gathered from FIGS. 2A, 2B and 2C, positioned substantially diametrically facing the sleeve segment 12, 12' on the outer circumference of the scraper body 11.

Figure 3C:
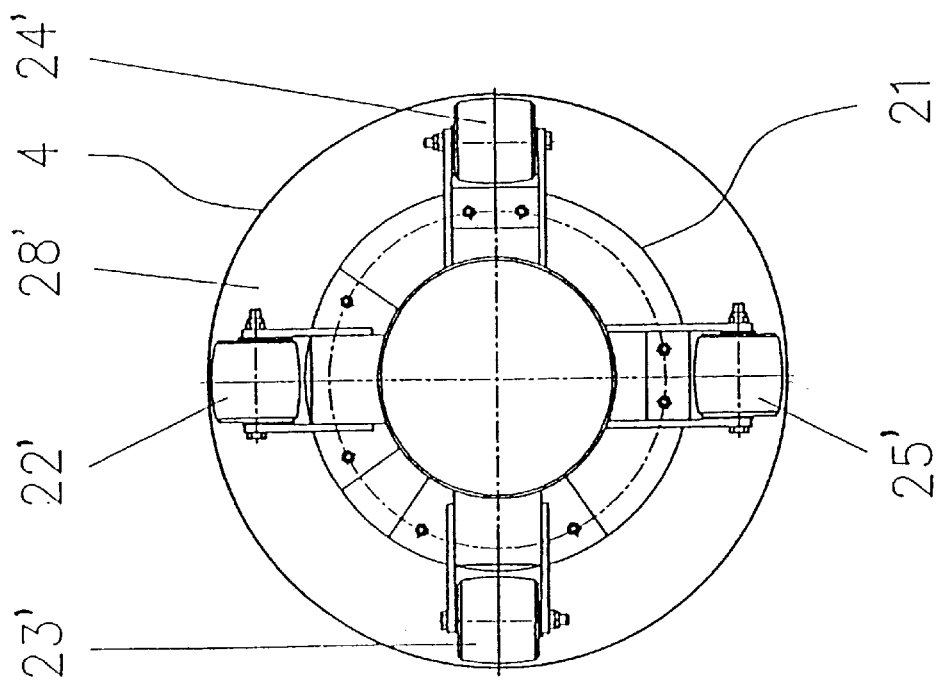

In the case of the scraper 20 according to the invention shown in FIGS. 3A, 3B and 3C, on the axially front and rear ends and namely on the outer circumference of the scraper body 21 are provided four rollers 22, 23, 24, 25 at the front and 22', 23', 24', 25' at the rear. These pairs of four rollers 22, 23, 24, 25, and 22', 23', 24', 25' are in each case displaced with respect to one another by 90° and fixed on the scraper body 21. The rollers 24, 25 and 24' and 25' are travel elements fixed to the scraper body, whereas the rollers 22, 23, 22', diametrically facing the rollers 24, 25, are suspended thereon by means of spring-loaded, bend-in arms 26, 26' and fixed to the scraper body 21. The rollers 22, 23, and 22', 23', serving together with the spring-loaded, bend-in arms 26, 26' as radially resilient travel elements, are used for compensating diameter changes, whereas the radially rigid rollers 24, 25 and 24' and 25' restrict the freedom of movement of the scraper 20 and thus ensure a uniform position of the gyroscopic platform parallel to the pipe axis R. The same applies for the sliding blocks 13, 14, and 13' and 14' and the sleeve segment 12, 12' in FIGS. 2A and 2B.

In the embodiments shown in FIGS. 2A and 2B and 3A and 3B, in the scraper body 11, 21 travel direction indicated by the arrow B, upstream of the rollers 22, 23, 24, 25 or 22', 23', 24', 25' or sliding blocks 13, 14, and 14' are in each case provided at each end conical sleeves 17, 17', 27, 27', whose cylindrical envelope surfaces have a smaller external diameter than the internal diameter of the pipeline 4. Between the sleeves 17, 17', 27, 27' and the rollers 22, 23, 24, 25 and 22', 23', 24', 25' or sliding blocks 13, 14, and 13',14' are provided, upstream of the latter, flexibly constructed sealing sleeves 18, 18', 28, 28' and in the represented embodiment these are so-called sealing disks. As shown in FIGS. 2 and 3, they are sealed in the pipeline and ensure the building up of the necessary travel differential pressure. So as not to guide the scraper, they are made very flexible.

If it is not only the path of the pipe or a local change in this path which is to be surveyed, on the represented, inventive scraper 10 or 20 can be suspended a corresponding scraper module for material testing, e.g. a measurement spinning unit of a bulge scraper.

What is claimed is:

1. A scraper which determines a position of pipelines comprising:
   a scraper body containing a gyroscopic platform, a processor and a power supply; and
   a plurality of supports joined to the scraper body which guide the scraper along an interior of the pipeline and respectively are disposed in a plurality of cylindrical sections intersecting a longitudinal axis of the scraper body at axially spaced apart locations on the longitudinal axis, each said support comprising at least three support elements which are separated circumferentially in one of the cylindrical sections and project radially outward from the scraper body for engaging the interior of the pipeline with at least one of the support elements being rigid and having a fixed radius and at least one of the support elements having a variable radius and being resilient which compensates for diameter changes of the interior of the pipeline.

2. A scraper in accordance with claim 1 wherein:
   each said resilient support element is a sleeve segment; and
   each said rigid support element is a sliding block.

3. A scraper in accordance with claim 2 wherein:
   a plurality of said sliding blocks project radially outward from the scraper body, are separated by an angle formed by an intersection of arms attached to the plurality of sliding blocks and are diametrically opposite the at least one resilient support element.

4. A scraper in accordance with claim 3 wherein:
   the angle is 90°.

5. A scraper in accordance with claim 3 wherein:
   each said sliding block is made from plastic.

6. A scraper in accordance with claim 2 wherein:
   each said sliding block is made from plastic.

7. A scraper in accordance with claim 2 wherein:
   the sleeve segment is formed from a rubber material.

8. A scraper in accordance with claim 7 wherein:
   the rubber material is polyurethane.

9. A scraper in accordance with claim 1 wherein:
   the at least one resilient support element is a roller which has a movable arm which may vary in radius with movement of the scraper body; and
   the at least one rigid support element is a roller which has a fixed arm which is fixed in radius with movement of the scraper body.

10. A scraper in accordance with claim 1 wherein:
    the at least one rigid support element further comprises a plurality of said rollers having said fixed arms which project radially outward from the scraper body and are separated by an angle formed by an intersection of the fixed arms;
    the at least one resilient support element further comprises a plurality of said rollers having said movable arms which project radially outward from the scraper body and are separated by an angle formed by an intersection of the movable arms;
    the plurality of said rollers having said fixed arms are diametrically opposite the plurality of said rollers having said movable arms.

11. A scraper in accordance with claim 10 wherein:
    each said angle is 90°.

12. A scraper in accordance with claim 10 wherein:
    each of the rollers is elastic.

13. A scraper in accordance with claim 9 wherein:
    each said sliding block is made from plastic.

14. A scraper in accordance with claim 1 wherein:
    the plurality of supports are joined to a front and a rear end of the scraper body with the front end facing a direction of travel of the scraper body.

15. A scraper in accordance with claim 1 further comprising:
    a plurality of emergency support elements, each said emergency support element being joined to the scraper body, being respectively positioned relative to a direction of travel of the scraper in the pipeline in front of a different one of the supports and having a diameter which is less than an internal diameter of the pipeline.

16. A scraper in accordance with claim 15 wherein:
    the emergency support elements are disks.

17. A scraper in accordance with claim 15 further comprising:
    a plurality of flexible sealing sleeves joined to the scraper body, each said sealing sleeve being disposed between one of the supports and one of said emergency support elements.

18. A scraper in accordance with claim 17 wherein:
    the plurality of flexible sealing sleeves are sealing disks which project radially outward from the scraper body.

* * * * *